United States Patent [19]
Goldhagen et al.

[11] Patent Number: 5,323,450
[45] Date of Patent: * Jun. 21, 1994

[54] TELEPHONE NETWORK APPLICATION PLATFORM FOR SUPPORTING FACSIMILE APPLICATIONS

[75] Inventors: Bruce Goldhagen, Newtown Square, Pa.; Michael S. Recant, Midlothian, Va.; David W. Heileman, Jr., Paoli; Frederick C. Kruesi, Exton, both of Pa.

[73] Assignee: Unisys Corporation, Blue Bell, Pa.

[ * ] Notice: The portion of the term of this patent subsequent to Jul. 21, 2009 has been disclaimed.

[21] Appl. No.: 847,150

[22] Filed: Mar. 5, 1992

[51] Int. Cl.⁵ .................................... H04M 11/00
[52] U.S. Cl. ............................ 379/100; 358/442; 358/468
[58] Field of Search ............. 379/100, 93, 96, 97, 379/98; 358/400, 403, 442, 444, 468

[56] References Cited

U.S. PATENT DOCUMENTS

| | | | |
|---|---|---|---|
| 4,827,349 | 5/1989 | Ogata et al. | 358/442 |
| 4,922,348 | 5/1990 | Gilon et al. | 358/442 |
| 4,974,254 | 11/1990 | Perine et al. | 379/100 |
| 5,048,078 | 9/1991 | Satomi | 379/100 |
| 5,133,004 | 7/1992 | Heileman, Jr. et al. | 379/97 |

FOREIGN PATENT DOCUMENTS 62-227269 10/1987 Japan .................. 379/100

OTHER PUBLICATIONS

International Publication No. WO91/03115, Mar. 7, 1991 PCT by WIPO.
International Publication No. WO91/17616, Nov. 14, 1991, PCT by WIPO.
Katsuhiko Hagashi and Chiaki Motegi, Personal Computer Image Communications Using Facsimile, Feb. 1989, IEEE Journal on Selected Areas in Communications, vol. 7, No. 2, pp. 276-282.

Primary Examiner—Curtis Kuntz
Assistant Examiner—I. Rana
Attorney, Agent, or Firm—Albert B. Cooper; Mark T. Starr

[57] ABSTRACT

A voice Telephone Network Applications Platform (NAP) is enhanced to manage facsimile messages, as well as voice messages, by the addition of facsimile functionality to the platform actuatable by high-level facsimile commands from applications supported on the platform. The commands include sending and receiving facsimile messages. A PC facsimile processor (FP), interfacing between the platform and the telephone network, stores facsimile messages received from the network and facsimile messages for transmission to the network on hard disk. A facsimile command from an application is expanded into NAP commands for controlling the platform and FP commands for controlling the facsimile processor so as to perform the facsimile functionality associated with the facsimile command. A recovery process utilizing a Recovery Token prevents facsimile messages from becoming lost between receipt at the FP and storage in the platform.

32 Claims, 5 Drawing Sheets

NAPFE COMMAND AND RESPONSE COMMON HEADER AND BODY

| 140 | 141 | 142 | 143 | 144 | |
|---|---|---|---|---|---|
| MESSAGE TYPE | FP NUMBER | PORT NUMBER | FAX NAME(S) | PHONE NUMBER | ... |

FP COMMANDS AND RESPONSES

FIG. 4A

| 150 | 151 | 152 | |
|---|---|---|---|
| MESSAGE TYPE | FAX NAME(S) | PORT NUMBER | ... |

FP FILE TRANSFER COMMANDS AND RESPONSES

FIG. 4B

TELEPHONE NETWORK APPLICATION PLATFORM FOR SUPPORTING FACSIMILE APPLICATIONS

CROSS-REFERENCE TO RELATED APPLICATIONS

U.S. patent application Ser. No. 07/521,210; filed May 7, 1990; entitled "Digital Computer Platform For Supporting Telephone Network Applications"; by D. W. Heileman, Jr. et al, now U.S. Pat. No. 5,133,044.

U.S. patent application Ser. No. 07/514,7837 filed Apr. 25, 1990; entitled "Apparatus And Method For Providing Recoverability In Mass Storage Data Base Systems Without Audit Trail Mechanisms"; by F. C. Kruesi. et al, now U.S. Pat. No. 5,138,710.

U.S. patent application Ser. No. 07/503,195; filed Apr. 2, 1990; entitled "Apparatus For Interfacing A Real-Time Communication Link To An Asynchronous Digital Computer System"; by R. A. Latimer et al, now U.S. Pat. No. 5,255,371.

Said U.S. Pat. No. 5,133,004; 5,138,710 and 5,255,371 (NAP PATENTS) are assigned to the Assignee of the present invention and are incorporated herein in their entirety.

Said U.S. Pat. No. 5,133,004 covers the basic Network Application Platform (NAP) for supporting voice oriented applications and which has been enhanced and extended to support facsimile oriented applications as described hereinbelow. Said U.S. Pat. No. 5,138,710 discloses the NAP voice file (VMMM) for storing voice data and which is utilized for storing facsimile data as described hereinbelow. Said U.S. Pat. No. 5,255,371 discloses the voice interface between the telephone network and the NAP. The interface has been enhanced and extended for facsimile communication.

BACKGROUND OF THE INVENTION

1. Field of the Invention

The invention relates to providing facsimile (fax) services over the telephone network via application software for such services and involves a telephone network digital computer platform for supporting such application software.

2. Description of the Prior Art

The facsimile machine has become ubiquitous in present day communication for transmission of documents. Facsimile transmission over the Public Switched Telecommunications Network (PSTN) annually generates billions of dollars in toll revenues. A variety of facsimile related services and enhanced services are currently available, such as Call Answer, Fax Store and Forward, Fax Mailbox, and the like. Generally, such services are provided by dedicated systems specifically designed for the service and for the hardware environment in which the system will be deployed. Such systems tend to lack flexibility, in that desired changes in functionality often require extensive, and hence expensive, modifications to the application software. Additionally, application software for providing such services are not portable in that a change in hardware environment usually requires substantial application software re-writing. Although such systems are usually computer based, such systems can only perform the functions for which they were designed and, thus, cannot also be utilized to perform general purpose data processing. Also, such systems generally do not have access to data bases stored on general purpose computers. Additionally, if it is desired to provide a wide variety of services, utilization of a large number of dedicated systems tends to be prohibitively expensive.

Since the divestiture, the Bell Operating Companies (BOCs) and Independent Telephone Companies (Telcos) have been seeking ways to increase the return on their primary asset; viz, the installed network. One source of increased revenue would be to offer new facsimile related services that integrate into, or interface with the existing network, resulting in greater utilization thereof. It is generally difficult for BOCs and Telcos to provide new services because network switches are designed to switch calls, not support data base or special service related functionality. Each Central Office (CO) utilizes a predetermined set of functions provided by the switch manufacturer. Only the manufacturer could add new services to the switching system which usually involves substantial lead times, such as two years or more. Additionally, the switch manufacturers have been particularly slow in responding to the needs of the BOCs and Telcos for enhanced service provisioning. A major limiting factor to providing new facsimile related services is a dependence on the telephone switch provider for implementing the capabilities required by these new services.

In addition to the above disadvantages, it is believed that currently available facsimile service systems do not have the capability of sending and receiving facsimile transmissions over a currently established voice connection. Present day systems are believed to terminate a voice connection and then re-dial a fax machine for the facsimile transmission. It is furthermore believed that present day systems do not have the capability of common storage of voice and fax images in the same data base. Separate facilities are believed to be required. It is furthermore believed that present day facsimile systems effect fax transmissions in an inefficient interactive mode utilizing flow control such as transmitting one Rage at a time.

Although the system of said U.S. Pat. No. 5,138,004 overcomes the disadvantages described above with respect to voice communication, the advantages realized by the platform of said U.S. Pat. No. 5,133,004 for voice has not, prior to the present invention, been achieved for fax.

SUMMARY OF THE INVENTION

The present invention overcomes the above-described disadvantages of the prior art by providing, for the first time, a Telephone Network Applications Platform that interfaces with the telephone network and supports facsimile oriented application software that provides facsimile oriented services. The present invention is an enhancement and extension of the Telephone Network Applications Platform disclosed in said U.S. Pat. No. 5,133,004. The NAP interfaces between the telephone network and a facsimile application program and comprises a digital computer programmed to perform facsimile oriented telephone network functionality in response to facsimile oriented commands issued by the facsimile application program. The facsimile oriented telephone network functionality resides in the computer independent of the facsimile application program and is actuatable in response to the commands. The commands include a Send Fax command and a Receive Fax command, the telephone network facsimile functionality including sending a facsimile message to the network and receiving a facsimile message from the network in response to the Send Fax command and the Receive Fax command, respectively. An application interface coupled between the facsimile application program and the computer responds to the commands from the application for actuating the telephone network facsimile functionality in response to and in accordance with the commands. The application interface is responsive to the Send Fax command and the Receive Fax command from the application for activating the telephone network facsimile functionality by causing a facsimile message to be sent to the network and causing a facsimile message to be received from the network in response to the Send Fax command and the Receive Fax command, respectively. A network facsimile interface coupled between the network and the computer conveys the facsimile messages therebetween.

As described in said U.S. Pat. No. 5,133,004, the NAP includes a data base and voice file for storing voice messages. The fax messages are also stored in the voice file and managed by the data base. The computer also includes the telephone network functionality relating to voice messages and call connectivity actuatable by AIM commands as described in said U.S. Pat. No. 5,133,004. The network facsimile interface preferably includes a Fax Processor for accepting facsimile messages from and delivering facsimile message to the network. The facsimile extensions of NAP preferably include a Fax Server for interpreting and expanding the facsimile commands into FP commands for controlling the Fax Processor and into AIM commands for performing the NAP functionality required to execute the facsimile commands.

In the preferred embodiment, communication means interposed between the application and the application interface directs AIM commands to NAP to be executed in the manner described in said U.S. Pat. No. 5,133,004 and facsimile commands to the Fax Server for execution. Alternatively, the Fax Server and communication means can be integrated into NAP with AIM commands and facsimile commands appropriately directed and executed.

Additionally, a recovery process is utilized with respect to a Recovery Token for assuring that no faxes are lost between receipt at the FP and entry into the NAP storage file.

BRIEF DESCRIPTION OF THE DRAWINGS

FIG. 4A is a diagram illustrating the format of the FS to FP command.

FIG. 4B is a diagram illustrating the format of the FP file transfer command.

DESCRIPTION OF THE PREFERRED EMBODIMENT

Figure 1:
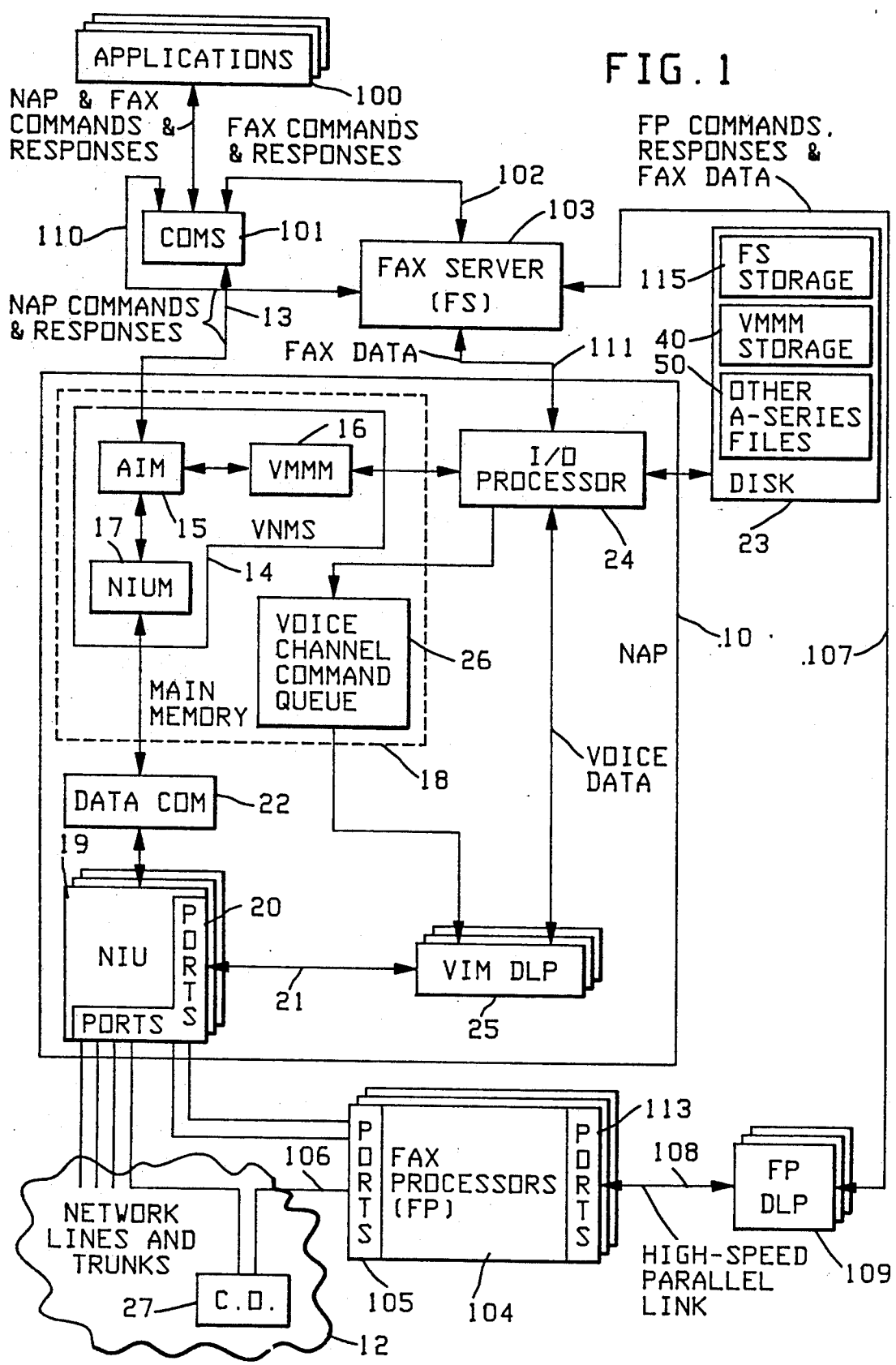
FIG. 1 is a schematic block diagram illustrating the overall architecture of the NAP with Fax Extensions (NAPFE) in accordance with the present invention and the environment in which the NAPFE is deployed.

Referring to FIG. 1, a NAP 10 and disk system 23 is illustrated with the NAPFE components utilized to extend the NAP 10 to provide facsimile oriented functionality. Reference numerals below 100 refer to NAP and reference numerals above 100 refer to NAPFE. The NAP 10 with the disk system 23 is preferably implemented on an A-Series digital computer system commercially available from Unisys Corporation of Blue Bell, Pennsylvania, and is described in detail in said NAP PATENTS. The NAP 10 will be briefly described herein for continuity.

The NAP 10 interfaces between telephone network application programs 100 and a telephone network 12. The applications 100 may comprise voice oriented programs that are managed by the NAP 10 in the manner described in said NAP PATENTS, facsimile oriented applications, and a combination of voice and facsimile. The applications 100 communicate with the NAP 10 through message passing communication apparatus 101 such as the A-Series COMS.

As described in said U.S. Pat. No. 5,133,004, the NAP 10 is comprised of an Application Interface Module (AIM) 15, a Voice Message Management Module (VMMM) 16, an Network Interface Unit Manager (NIUM) 17, and Network Interface Units (NIUs) 19. The applications 100 communicate with the AIM 15 via dialogs comprising sequences of NAP commands and responses which are also referred to herein and in said U.S. Pat. No. 5,133,004 as AIM commands and responses, as well as NAP AIM commands and responses NAP protocol requires that the commands and responses occur in pairs with a response returned by the AIM 15 to the application for each command issued by the application to the AIM 15. In the manner described with respect to U.S. Pat. No. 5,133,004, the COMS 101 directs NAP commands received from an application 100 to the AIM 15 along a path 13 and receives NAP responses from the AIM 15 along the path 13. In a manner to be described with respect to the present invention, the COMS 101 conceptually intercepts NAPFE commands from the applications 100 and sends the NAPFE commands along a path 102 to a Fax Server (FS) 103 for interpretation and processing. NAPFE responses returned to the Fax Server 103 in response to a NAPFE command are transmitted back to the applications 100 through COMS 101 via the path 102.

All of the AIM protocols described in U.S. Pat. No. 5,133,004 with respect to dialogs, commands and responses apply to the NAPFE of the present invention. Thus, communication is via the exchange of command and response messages. For every command, there will be only one response. The applications 100 cannot spontaneously generate a command. The applications 100 can only issue a command after receipt of a response from NAP or NAPFE. After issuing a command, the applications 100 wait until a response is received before issuing another command.

The NAPFE of the present invention includes a plurality of Fax Processors (FP) 104 which are utilized for delivering facsimile messages to the network 12 and for receiving facsimile messages therefrom via ports 105.

The facsimile communication between the Fax Processors 104 and the network can be direct to a Central Office 27, via a link 106, or via the NIU 19 through NIU ports 20. Each Fax Processor 104 performs all of the functions associated with sending and receiving facsimile messages in accordance with present day facsimile messaging protocol. For example, the Fax Processors 104 are compatible with Group III CCITT specifications T.4, T.30, and V.29. The Fax Processors 104 communicate with the Fax Server 103 through ports 113 via a path 107 and a high-speed parallel line 108 through Fax Processor Data Link Processors (FP DLP) 109. Each Fax Processor 104 communicates with the Fax Server 103 via a respective FP DLP 109.

As described above, a fax command from an application 100 is transmitted by COMS 101 along the path 102 to the Fax Server 103. The Fax Server 103 interprets each fax command as a sequence of FP commands for the Fax Processors 104 and normal NAP AIM commands to be processed by the NAP 10. The FP commands are issued to the Fax Processors 104 via the path 107, the FP DLP 109 and the high-speed link 108. The Fax Processors 104 return FP responses to the Fax Server 103 via the path comprising the components 107, 108 and 109. Facsimile data is also communicated between the Fax Processors 104 and the Fax Server 103 via this path. The NAP AIM commands that form part of the fax commands are transmitted by the Fax Server 103 to the AIM 15 through the COMS 101 via a path 110. Concomitant NAP responses are returned to the Fax Server 103 through the COMS 101 via the path 110.

Figure 3:
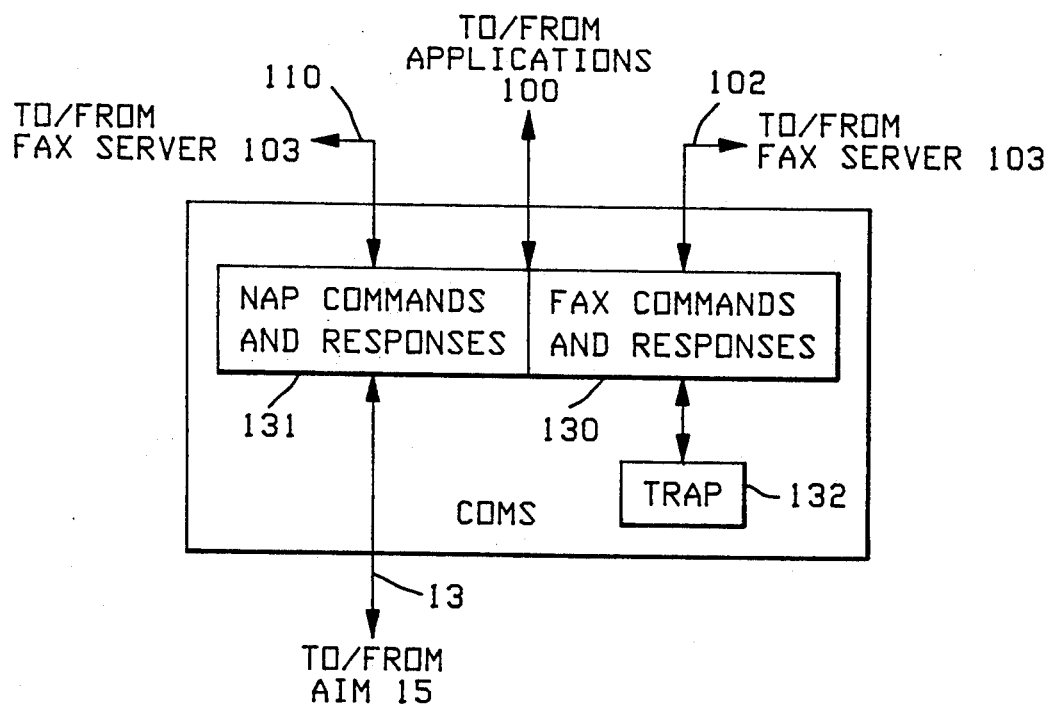
FIG. 3 is a schematic block diagram illustrating functional details of the COMS interface of the NAPFE of FIG. 1.

In operation, COMS 101 intercepts the NAP and NAPFE commands from the applications 100 and the FS 103 and the responses from AIM 15 and FS 103 and calls a processing item (from FS 103), functionally illustrated in FIG. 3, to appropriately direct the messages. The NAP AIM commands from the applications and the NAP AIM commands used in NAPFE processing are forwarded to the AIM 15. The NAPFE commands from the applications are processed by FS 103. Responses resulting from NAP AIM commands from an application 100 are returned to the application. Responses resulting from NAP AIM commands used in NAPFE processing are returned to FS 103.

The Fax Server 103 maintains temporary storage files 115 on the disk system 23 through the A-Series I/O processor 24. Fax data is written to and read from this file by the Fax Server 103 via a path 111 utilizing standard A-Series file access mechanisms. Additionally, other A-Series files 50, such as application files, are maintained on the disk system 23.

As described in said U.S. Pat. No. 5,133,004 and said U.S. Pat. No. 5,138,710 the VMMM 16 under direction of the AIM 15 maintains a data base voice file 40 on the disk system 23 for storing voice messages that are received from and sent to the network 12. The NAP 10 assigns a unique Message Number (MN) to each voice message in the file. In a manner to be later described, fax messages that are received from and transmitted by the Fax Processors 104 are also maintained in the NAP data base file 40. The NAP 10 also assigns unique MNs to the fax messages stored in the NAP data base 40 on the disk system 23.

The AIM 15 controls the switching of the ports of the NIU 19 through the NIUM 17 and manages the call signalling, as described in said U.S. Pat. No. 5,133,004. Furthermore, as described in said NAP PATENTS, the VIM DLPs 25 manage the communication of voice messages to and from the network 12 through the NIUs 19 under control of commands from the voice channel command queue 26 as described in further detail in said U.S. Pat. No. 5,255,371.

As described in said U.S. Pat. No. 5,133,004, the NAP 10 is programmed with telephone network functionality invoked by AIM commands from the applications. These commands include DELETE VOICE MESSAGE, CONNECT CALL, TERMINATE DIALOG, COLLECT DIGITS, INITIATE CALL, TERMINATE CALL, GET MESSAGE NUMBERS, GET VOICE MESSAGE, CREATE VOICE MESSAGE, and PIVOT CALL. The details of these commands and the invoked functionality are set forth in said U.S. Pat. No. 5,133,044. Briefly, the DELETE VOICE MESSAGE command deletes a named message from the NAP data base. The CONNECT CALL command switches the incoming NIU port of the call from the current outgoing port to a new outgoing port. The TERMINATE DIALOG command terminates the dialog represented by the dialog ID. With respect to the COLLECT DIGITS command, it is appreciated that NAPFE does not process digits. The command is utilized by NAPFE as a time-out. The INITIATE CALL command initiates a call to the network. The TERMINATE CALL command terminates a call. The GET MESSAGE NUMBERS command causes the NAP 10 to provide to the application all of the Message Numbers of the messages stored in the NAP data base file that are associated with the application. This command is used for message reconciliation as described in said U.S. Pat. No. 5,133,004 and said U.S. Pat. No. 5,138,710. The GET VOICE MESSAGE command controls the NAP 10 to place the data of a named message in the NAP data base file into a named A-Series disk file. The CREATE VOICE MESSAGE command copies a message from a named A-Series file into the NAP data base file. The PIVOT CALL command changes the outgoing NIU port to an incoming port and establishes a new outgoing port.

The Fax Processors 104 send to and receive from the network fax messages over a currently existing connection upon receipt of a NAPFE command. In order to establish such connections, the applications 100 utilize the following AIM commands: CONNECT CALL, INITIATE CALL, and PIVOT CALL. The NAPFE utilizes the following AIM commands as part of the NAPFE commands: CONNECT CALL, COLLECT DIGITS, GET VOICE MESSAGE, and CREATE VOICE MESSAGE. The COLLECT DIGITS command is utilized as a time-out to get an on-hook notification from the NIU 20, in a manner to be described. The GET VOICE MESSAGE and CREATE VOICE MESSAGE commands are utilized by the Fax Server 103 to transfer fax messages between the Fax Processors 104 and the NAP data base message file in a manner to be explained.

The NAP 10 establishes a platform to provide basic voice management services to an application. NAPFE provides a similar set of fax management services by the addition of elements 102-111 and the modification of COMS 101 to direct fax commands to the Fax Server 103. The Fax Server 103 adds a set of fax oriented commands to the AIM command set of the AIM 15 thereby providing extensions to the AIM command set. NAPFE performs four basic facsimile oriented functions as follows:

Answer and Receive a Fax. This function is basic to facsimile machines. NAPFE will answer an incoming call and receive a fax message. The call may be answered directly or a voice dialog first performed.

Answer and Send a Fax. NAPFE supports the capability of answering an incoming call and transmitting a fax at the originator's request. In a fax mail application, after a voice dialog, the subscriber can request that the existing connection be used to send a fax to the subscriber's fax machine. This function can also be used during polling where a fax machine polls NAPFE over the network to receive a fax therefrom.

Originate and Send a Fax. This basic fax machine function involves the fax application dialing out over a telephone line, connecting to a remote fax machine and transmitting a fax image thereto.

Originate and Receive a Fax. This function is utilized when NAPFE polls a remote fax machine to receive faxes that reside there at for pick-up.

Figure 2:
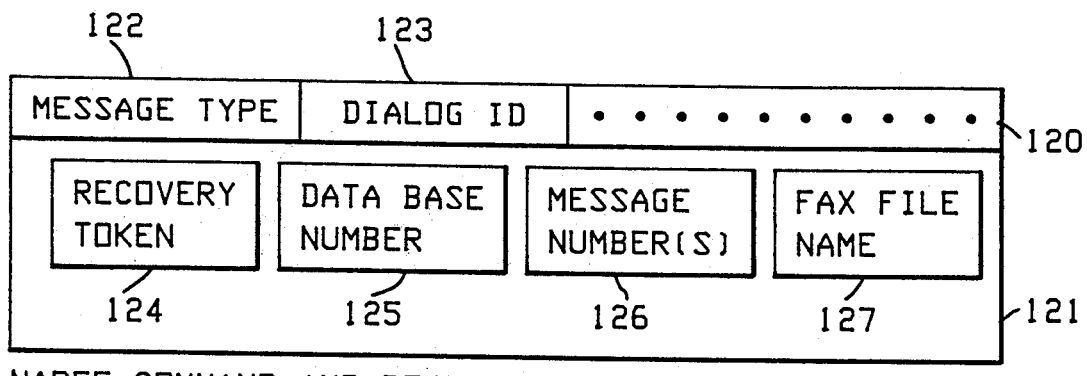
FIG. 2 is a diagram illustrating the format of the NAPFE command and response common header utilized within the NAPFE of FIG. 1. The command body is also illustrated.

Referring to FIG. 2, the NAPFE command and response have a common header, the format of which is illustrated at 120. The command and response body is also depicted at 121. The header 120 includes a Message Type field 122 for containing a numerical representation of the command or response type. A Dialog ID field 123 identifies the NAP or NAPFE dialog with which the command or response is associated. The header 120 is substantially the same as the AIM command and response common header described in said U.S. Pat. No. 5,133,004. The body 121 of the command or response includes any or all of the following: a Recovery Token field 124, a Data Base Number field 125, a Message Number field 126 and a Fax File Name field 127 for conveying a Recovery Token, a Data Base Number, one or more NAP Message Numbers (MN), and an A-Series file title, respectively. The Recovery Token is utilized in a recovery process, to be described, to receive potentially lost faxes. The Data Base Number identifies the application associated with the command or response. Each NAP and NAPFE application has a unique Data Base Number assigned by NAP. The MN identifies fax message(s) involved in the command or response. The Fax File Name identifies a file containing a fax message.

Referring to FIG. 3, functional details of the COMS 101 are illustrated. The COMS 101 utilizes a NAPFE processing item comprised of a Fax Commands and Responses block 130 and a NAP Commands and Responses block 131. Standard NAP commands from the applications 100 are directed by the block 131 to the AIM 15 along the path 13. Similarly, standard NAP commands that form part of the fax commands are also transmitted by the block 131 from the path 110 to the AIM 15 via the path 13.

The fax commands intercepted by the block 130 are transmitted to the Fax Server 103 along the path 102. All standard NAP commands and responses and all fax commands and responses have unique Message Type numbers stored in the field 122 of the command header (FIG. 2). The blocks 130 and 131 direct the commands from the applications 100 either to the Fax Server 103 or to AIM 15 on the basis of the Message Type numbers.

Fax responses received at the block 130 from the Fax Server 103 along the path 102 are transmitted back to the applications 100. AIM responses received at the block 131 from AIM 15 along the path 13 that belong to non-fax dialogs are transmitted back to the applications 100 in the manner described in said U.S. Pat. No. 5,133,004. AIM responses received at the block 131 along the path 13 that belong to fax dialogs are transmitted back to the Fax Server 103 along the path 110. The separation between fax and non-fax responses is based on the unique Message Type numbers or on the dialog ID stored in the fields 122 or 123, respectively, of the response headers (FIG. 2). A dialog table (not shown) maintained by NAPFE (Fax Server 103), and available to COMS 101, identifies the fax and non-fax dialogs.

It is appreciated from the foregoing, that the Fax Server 103 appears as an application to the AIM 15 communicating therewith through the COMS portion 131 utilizing the standard AIM protocols described herein and in said U.S. Pat. No. 5,133,004. The COMS 101 also includes a command trap 132 for reasons to be explained.

As discussed above, the Fax Server 103 sends Fax Processor (FP) commands to the Fax Processors 104 and receives FP responses therefrom. The FP commands are of two types; viz., FP commands for sending and receiving faxes and FP commands for file transfers between the Fax Processors 104 and NAP disk. Referring to FIG. 4A, the format of the FP command and response involved in fax communication is illustrated. A Message Type field 140 designates the type of command or response. An FP number field 141 designates the Fax Processor selected in the dialog. A port number field 142 designates the FP port selected in the dialog. A fax name field 143 identifies the files with which the command is involved and a phone number field 144 designates a phone number to be out-dialed by the Fax Processor in performance of the command.

Referring to FIG. 4B, the format of the FP file transfer command and response is illustrated, A Message Type field 150 designates the command or response type. A fax name field 151 identifies the fax files with which the command or response is involved and a port number field 152 denotes the FP port with which the file transfer is associated.

Figure 5:
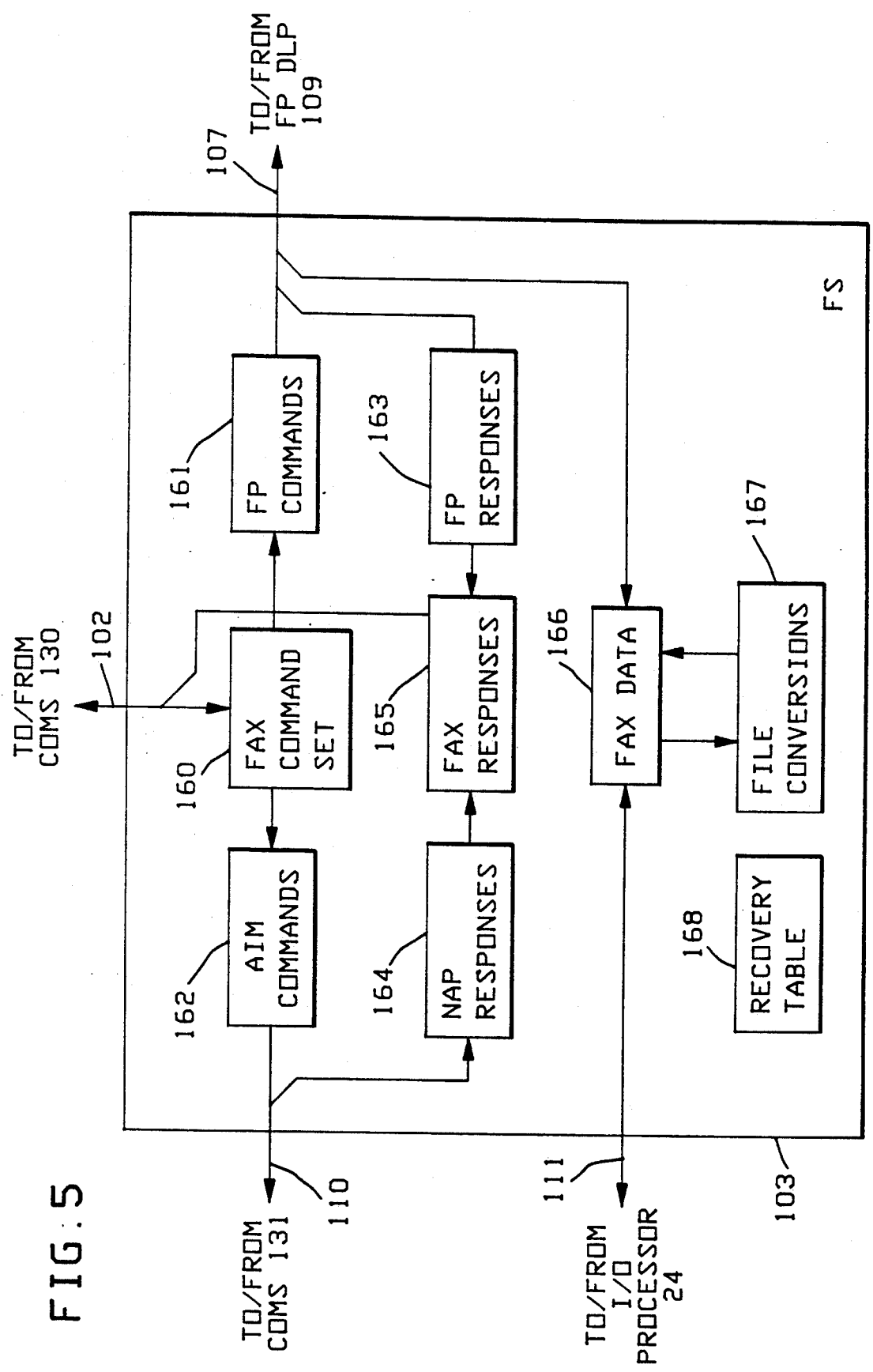
FIG. 5 is a schematic block diagram illustrating functional details of the Fax Server (FS) of the NAPFE of FIG. 1.

Referring to FIG. 5, with continued reference to FIG. 1, functional details of the Fax Server (FS) 103 are illustrated. A fax command set 160 is conceptually illustrated as comprising FP commands 161 and AIM commands 162. The fax commands are received from the applications 100 through the COMS portion 130 along the path 102. As previously described, the FP commands 161 are transmitted along the path 107 to the Fax Processors 104 via the FP DLP 109. FP responses from the Fax Processors 104 are received at the FS 103 along the path 107 as conceptually indicated at 163. The FP responses are utilized by the FS 103 in performing the steps and commands comprising each fax command in the fax command set 160.

The AIM commands 162 are transmitted to AIM 15 (FIG. 1) through the COMS portion 131. The NAP responses to the AIM commands 162 are received at the FS 103 through the COMS portion 131 as conceptually illustrated at 164. The FS 103 utilizes the NAP responses 164 in executing the various steps and commands that comprise each fax command in the fax command set 160. Additionally, the NAP responses 164, as well as the FP responses 163, are utilized by the FS 103 to form the fax response for each received fax command as conceptually illustrated at 165. The fax responses 165 are transmitted back to the applications 100 (FIG. 1) through the COMS portion 130. It is appreciated that when a NAPFE command is issued by the application, it may result in issuance of multiple AIM and FP commands and responses.

The NAP 10 maintains fax and voice messages stored in the NAP data base file on the disk 23. Additionally, the FS 103 maintains A-Series files for temporary storage on the disk system 23 and, as discussed in said U.S. Pat. No. 5,133,004, the applications 100 may maintain A-Series files thereon. Furthermore, the Fax Processors 104 store fax message files for transmission to the network 12 or after receipt therefrom. There are differences in I the file formats of the application files, the FS files, the NAP data base files, and the FP files that may require conversion.

The FS 103 receives fax data from the Fax Processors 104 along the path 107 and temporarily holds the data as schematically indicated at 166. Requisite file conversions are performed at 167 and the FS 103 transmits the converted fax file to the I/O processor 24 along the path 111 for storage in the temporary A-Series disk file of the FS 103. The temporarily stored file is transferred to the NAP data base message file utilizing the NAP CREATE VOICE MESSAGE command in the manner described in said U.S. Pat. No. 5,133,004. Conversely, a fax message to the network is provided along the path 107 from the fax data storage block 166 after appropriate file conversion 167 is performed. The FS 103 obtains this fax data from its temporary A-Series file via the I/O processor 24 along the path 111. In the manner described in said U.S. Pat. No. 5,133,004, this file may be obtained from the NAP data base message file into the FS temporary disk file via a NAP GET VOICE MESSAGE command.

The Fax Server 103 also includes a Recovery Table 168 utilized in a fax message recovery process to be described.

Figure 6:
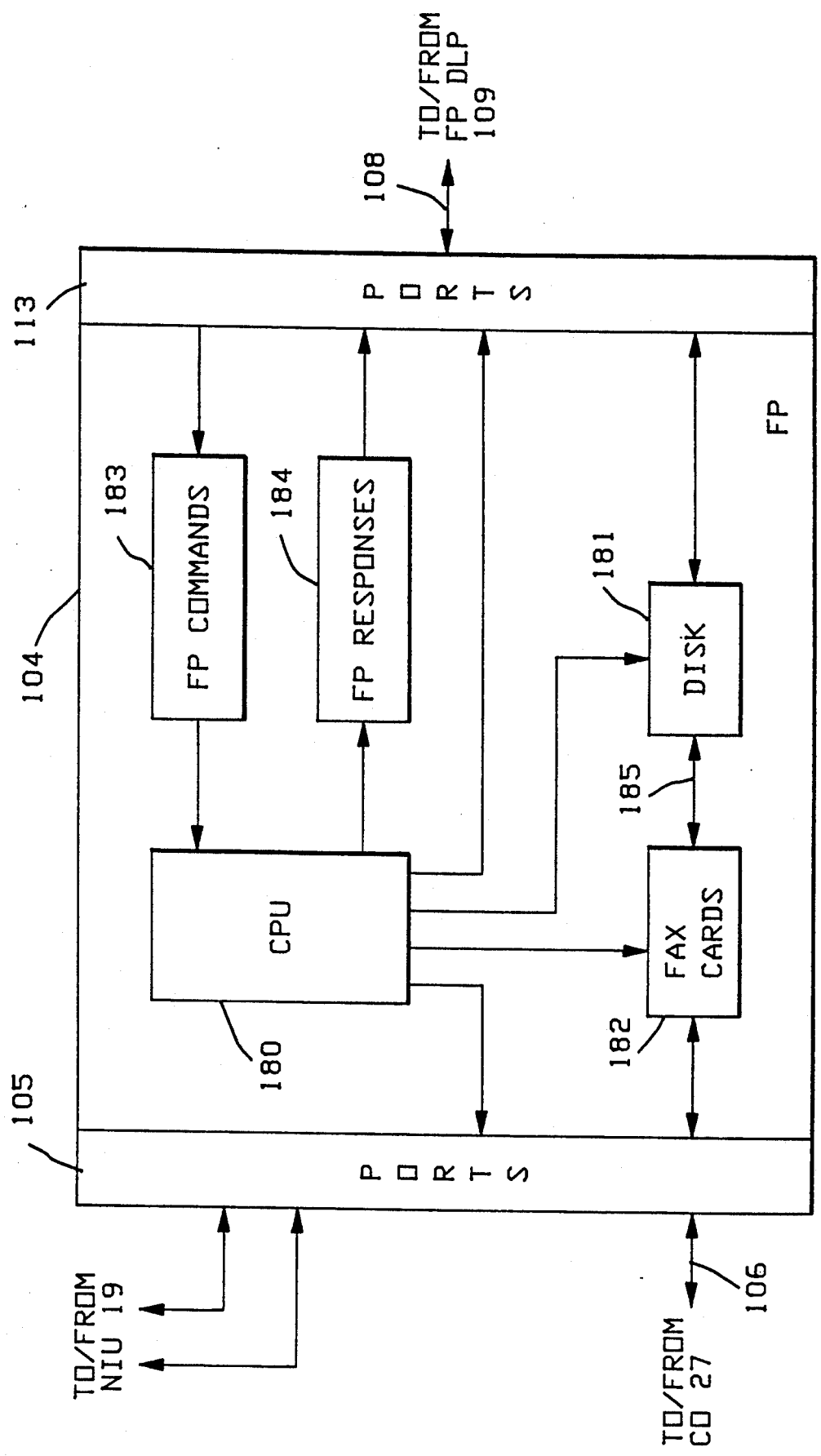
FIG. 6 is a schematic block diagram illustrating functional details of the Fax Processor (FP) of the NAPFE of FIG. 1.

Referring to FIG. 6, with continued reference to FIG. 1, functional details of the Fax Processor 104 are illustrated. The Fax Processor 104 is a conventional AT/PC with commercially available facsimile cards installed in the AT slots thereof. A CPU 180 controls the ports 105 for direct connection to the network via the path 106 and for connection to the network via the NIUs 19 as illustrated. The Fax Processor 104 includes a hard disk 181, controlled by the CPU 180, for temporarily storing the facsimile messages after receipt from, or before transmission to, a facsimile machine via the network or CO 27. The fax communication is through fax cards 182 and the ports 105.

The fax cards 182 are installed in the AT slots and communicate with the ports 105 under control of the CPU 180. The fax cards are commercially procurable and may, for example, be implemented by GammaLink PC facsimile cards available from GammaLink Corporation of Sunnyvale, Calif.

The fax cards 182 communicate with the hard disk 181 under control of the CPU 180, as conceptually illustrated at 185. It is appreciated that the fax cards 182 access the disk 181 through the CPU 180 via a software interface (not shown) procurable with the cards and installed on the fax cards 182 and the CPU 180.

Functionally, the hard disk 181 communicates through the ports 113, as controlled by the CPU 180, to the link 108 for intra-system file transfers in a manner to be described. It is appreciated that disk communication is effected through the PC DOS operating system in a well known manner.

The Fax Processor 104 receives the FP commands from the FP DLP 109 over the link 108 through the ports 113 as conceptually indicated at 183. The Fax Processor 104 sends FP responses back over the link 108 through the ports 113 as conceptually indicated at 184.

The CPU 180 may, for example, be implemented by an 80286/12 MHz processor card. The Fax Processor 104 is preferably of an industrialized rack-mounted hardware configuration, but is a conventional 286 class PC running standard PC DOS from the hard disk 181. The FP 104 can dial out to the phone number in the phone number field 144 (FIG. 4A) via the fax cards 182.

With reference to FIG. 1, it is appreciated that the Fax Processor 104 operates asynchronously with respect to the Fax Server 103. After the Fax Processor 104 is commanded by the Fax Server 103 to receive a fax from the network, the fax message is completely received and stored on the disk 181 without NAPFE intervention. Similarly, after a fax is stored from the Fax Server 103 on the disk 181 for transmission to the network and the Fax Processor 104 is commanded by the Fax Server 103 to effect the transmission, the fax message is sent by the Fax Processor 104 without intervention from NAPFE.

The following table provides a list of the NAPFE Command Set 160 (FIG. 5), which commands are expected from an application in a dialog. Commands are sent from an application 100 to NAPFE when the application wants NAPFE to perform a facsimile oriented function. Within each dialog there is a one-to-one relationship between commands and responses; i.e., for each command sent by the application 100, NAPFE will return a response and for each response returned by NAPFE, the application will issue a command.

| NAPFE COMMANDS AND VALID RESPONSES | | |
|---|---|---|
| Message Type | Command | Valid Responses |
| 23 | RecvFax | 114 |
| 24 | SendFax | 115 |
| 25 | PollandRecvFax | 114 |
| 26 | SendFaxafterPoll | 115 |
| 27 | CreateFax | 116 |
| 28 | GetFax | 117 |
| 29 | RecoverFax | 114 |
| 30 | SendFaxfromFile | 115 |

The following table provides a list of the fax responses 165 (FIG. 5).

| NAPFE RESPONSES | |
|---|---|
| Response Type | Response |
| 114 | FaxReceived |
| 115 | FaxSent |
| 116 | FaxCreated |
| 117 | FaxObtained |

The following table sets forth the FP Command Set 161 (FIG. 5) and the FP Responses 184 (FIG. 6) with the preceding number representing the Message Type.

| FP COMMANDS AND VALID RESPONSES | |
|---|---|
| FP Commands | Valid Responses |
| 01 AnswerRecv | 50 FaxPortReady |
| 02 OriginateRecv | 51 ReceiveDone |
| 03 OriginateXmit | 52 TransmitDone |
| 04 AnswerXmit | 52 TransmitDone |
| 05 RemoveFile | 54 FileRemoved |

-continued

| FP COMMANDS AND VALID RESPONSES | |
|---|---|
| FP Commands | Valid Responses |
| 06 PortState | 55 PortStatus |
| 08 PortInitialize | 57 Initialized |
| 11 OrigXmitNIU | 50 FaxPortReady |
| 12 WaitCompleted | 51 ReceiveDone |
|  | 52 TransmitDone |
| 90 SendFile | 91 FileXfered |
| 92 ReceiveFile | 91 FileXfered |

It is appreciated that commands 01-12 control facsimile message transmission and reception functions, whereas commands 90 and 92 control functions relating to transferring files between the NAP disk 23 and the FP disk 181. Although file transfer is specified in terms of Send File and Receive File commands, A-Series file transfer mechanisms may be utilized that separately transfer Headers, Blocks and Records.

Details of the FP commands and responses sent from the FS 103 to the FP 104 and from the FP 104 to the FS 103, respectively, will now be described. The FP commands represent the total functionality that the NAPFE requires from the FP 104 so that the NAPFE can provide the facsimile oriented capabilities required by the applications 100. All FP commands result in a single response. These commands are used to control the actual fax operations that the FP 104 must execute.

Answer and Receive (Message Type 01). This command places the specified FP port into a mode where it will wait for ring, answer the phone and receive an incoming fax. The command generates an immediate response of FaxPortReady (Message Type 50) that will indicate that the FP port is ready and the call can be routed thereto. Two methods can be used to determine when the fax reception is complete. A PortState (Message Type 06) command can be issued to the FP port on a periodic basis. This permits the Fax Server 103 to determine the state of the fax operation. Alternatively, the Fax Server 103 can issue a WaitCompleted (Message Type 12) command causing a ReceiveDone (Message Type 51) response to be generated when the fax reception is complete.

Originate and Receive (Message Type 02). This command is used to cause the specified fax port to originate a call to the specified phone number and poll the answering machine for a fax. Thus, the FP 103 dials out through the specified fax port to poll for an incoming fax. The response to this command is a ReceiveDone (Message Type 51) which is issued when the operation is completed.

Originate and Transmit (Message Type 03). This command causes the designated FP port to call the specified phone number and to transmit the designated faxes. The FP 103 dials out through the specified fax port and sends the faxes. The response to this command is a TransmitDone (Message Type 52) which is issued at the completion of the fax operation.

Answer then Transmit (Message Type 04). This command causes the FP port to go into a state where it will wait for an incoming call, answer the phone and transmit the specified faxes when a poll is received from the other fax machine. The FP prepares to answer the incoming call on the specified fax port, be polled and then transmit the faxes. The response to this command is a TransmitDone (Message Type 52) which is received when the fax operation is complete.

Remove File (Message Type 05). This command causes the named files to be removed from the hard disk drive 181 of the FP. The command generates an immediate response of FileRemoved (Message Type 54).

Port State (Message Type 06). This command is used to inquire of the current status of the specified port and the results of the last fax operation of that port. The command generates an immediate result of PortStatus (Message Type 55) which details the current status of the port.

Port Initialize (Message Type 08). This command causes the specified fax port to be initialized. The port state is initialized to an Idle state. This command includes a field for a RemoveFile Flag which, if set, causes the FP 104 to remove all files on the FP hard disk 181 associated with the designated fax port. The command generates an immediate response of Initialized (Message Type 57).

Originate and Transmit through NIU (Message Type 11). This command causes the designated FP port to originate a call through the NIU 19. The command generates an immediate response of FaxPortReady (Message Type 50) denoting that the FP port is ready and a call will be initiated to the NIU 19 through a predetermined port 20. Two methods can be utilized to determine when the fax transmission is complete. A PortState (Message Type 06) command can be issued by the Fax Server 103 on a periodic basis. This permits the Fax Server to determine the state of the fax operation. Alternatively, the Fax Server can issue a WaitCompleted (Message Type 12) command. This causes a TransmitDone (Message Type 51) response to be generated when the fax transmission is complete.

Wait for Completed Fax (Message Type 12). This command is utilized on the selected fax port that has had a fax operation initiated using the AnswerRecv (Message Type 01) or the OriginateXmitNIU (Message Type 11) commands. While the port is in an Inuse state, this command causes a ReceiveDone (Message Type 51) or a TransmitDone (Message Type 52) response to be generated when the fax operation is complete. If the port is in a Completed state, the ReceiveDone and TransmitDone will be issued immediately.

Receive File (Message Type 92). This command transfers the named file from the PC hard disk 181 to the NAP memory disk system 23. When the operation is completed, the FileXfered response (Message Type 91) is issued.

Send File (Message Type 90). This command transfers the named file from the NAP memory disk system 23 to the PC hard disk 181. When the operation is complete, the FileXfered (Message Type 91) response is issued.

It is appreciated from the above, that file transfer is accomplished utilizing the file transfer message types 90 and 91. The file transfers are initiated by the File Server 103 (FIG. 1). The Fax Processor 104 never initiates a file transfer operation.

The FP 104 has a specific response for each of the above-described FP commands as conceptually illustrated at 184 of FIG. 6. The responses are as follows:

Fax Port Ready (Message Type 50). This response is the result of an AnswerRcv command (Message Type 01) or an OriginateXmitNIU (Message Type 11) command. The response indicates that the designated fax port is ready to receive or transmit a fax in an asynchronous fashion.

Receive Done (Message Type 51). This response is the result of an OriginateRcv command (Message Type 02). The response indicates that a fax has been successfully or unsuccessfully received. A Result field of the response indicates the success or failure of the received fax processing.

Transmit Done (Message Type 52). This is a response to either the OriginateXmit (Message Type 03) or the AnswerXmit (Message Type 04) commands. The response indicates the results of the fax transmit operation. A Status field of the response indicates the success or failure of the transmit fax processing.

File Removed (Message Type 54). This is the response to the RemoveFile command (Message Type 05). The response indicates the results of the RemoveFile request. The fax name field designates the names of the files removed from the FP hard disk 181.

Port Status (Message Type 55). This is the response to the PortState command (Message Type 06). It indicates the current state of the fax port specified by the Port Number field of the response. The response also includes a Result field indicating the success or failure of the last command's fax processing. A Port State field of the response indicates the current state of the port. The Port State field may indicate Idle, Inuse or Completed. A File Name field of the response lists the FP file names of the files of the current Send/Receive Fax command.

Initialized (Message Type 57). This is the response to the PortInitialize (Message Type 08) command. The response indicates the results of the initialize operation.

File Transferred (Message Type 91). This is the response to the SendFile (Message Type 90) and ReceiveFile (Message Type 92) commands. The response indicates the results of the last file transfer request.

As discussed above, when a fax specific command is issued by the application 100, the FS 103 will interpret it and execute it as a series of NAP commands associated with a series of FP commands. When the commands are processed, the Fax Server 103 will generate a fax response 165 (FIG. 5) and the COMS portion 130 (FIG. 3) will respond to the application 100. There is a one-to-one correspondence between commands and responses. All standard NAP functionality is available to a fax application. The primary difference between a NAP fax application and a standard NAP application is the additional NAPFE commands that are available Thus, the NAPFE commands sent from the applications 100 to NAPFE are interpreted by the Fax Server 103 and converted into the appropriate NAP and FP commands necessary to execute the desired function. Specifics of the NAPFE commands and responses will now be described.

Receive Fax (Message Type 23). This command is sent by the application to the Fax Server 103 of NAPFE to request that the FP receive a fax from a fax machine. The connection associated with the specified Dialog ID is used for the fax reception. In response to the Receive Fax command, the Fax Server 103 issues the AnswerRecv FP command to the Fax Processor which responds with FaxPortReady back to the Fax Server indicating that FP is ready to receive an incoming call from the NIU. The Fax Server then issues the NAP command Connect Call to switch the current NIU call connection of the specified dialog ID to the NIU port for the selected FP port. Thus, the incoming call is switched to the selected fax port. The NAP returns the Call Connected response to the Fax Server.

The Fax Server issues the Collect Digits command to the NAP as a timeout waiting to receive on-hook notification from the NIU. Collect Digits is set to specify 50 digits and a maximum timeout. The incoming line to the NIU is now connected to FP which, like a fax machine, receives the data and then hangs up. Upon receipt of the On-Hook, the NAP returns the Command Executed response to the Fax Server. The Fax Server then checks the Fax Processor to determine the receive status by issuing a PortState FP command and receiving a return of the PortStatus response from the FP. Alternatively, the Fax Server can issue the WaitCompleted command to the FP after receiving Call Connected from the NAP and then await receipt of ReceiveDone from the FP. ReceiveDone provides notification when the fax receipt has been accomplished by the FP.

The Fax Server then issues a file transfer command to the Fax Processor to move the fax from the PC hard disk 181 to the A-Series disk 23. To accomplish this, the FS issues the ReceiveFile command to the FP which transfers the fax file to the FS issuing a FileXfered response. The FS converts the file, if necessary, to A-Series format utilizing the file conversions 167 (FIG. 5). The FS stores the converted file in its temporary A-Series disk file 115 through the I/O processor 24 (FIG. 1). The FS then transfers the temporarily stored A-Series disk file to the VMMM data base 40 and removes it from the FP hard disk 181. This is accomplished by the FS issuing the Create Voice Message command to NAP to store the converted file in the VMMM data base. NAP responds to FS with the NAP Message Created response. The FS then issues RemoveFile to the FP which responds with FileRemoved. Alternatively, the FS issues the FP command PortInitialize setting the RemoveFile flag.

The FS then notifies the application of the successful receipt of the fax and the new fax's Message Number. This is accomplished by the FS issuing the NAPFE Fax Received (Message Type 114) response through the COMS portion 130 (FIG. 3) back to the application. The Fax Received response from the FS to the application consummates the Receive Fax command originally received by the FS from the application.

The Receive Fax command has a Recovery Token field that is used in the case of a system, COMS, NAP or application outage. During the recovery processing, to be described, the application uses this token to recover a fax that was in process at the time of an outage. The Receive Fax command also includes a DB Number field for containing the NAP application number for the current application. The DB Number is utilized to uniquely identify the application's Recovery Tokens. A standard NAP Terminate Dialog command issued by the application to NAP can close out the dialog.

Send Fax (Message Type 24). This command is sent by the application to the Fax Server 103 of NAPFE to request that the Fax Processor send a fax to a fax machine. The connection associated with the specified Dialog ID is used for the fax transmission. The command identifies the fax message or messages to be sent by Message Number utilizing the Message Number field 126 (FIG. 2). The FS retrieves the message from VMMM and has it transferred to the FP hard disk. This is accomplished by the FS first issuing to NAP the NAP Get Voice Message command for each message to be sent and waiting for the response from NAP of Command Executed for each Get Voice Message issued. The FS selects the FP port through which the fax transmission will occur. This can either be a port connected directly to the CO 27 or a port connected to the NIU 19 (FIG. 1). The FS issues the FP SendFile command to the File Processor listing the file names of the files built by the NAP Get Voice Message commands. Thus, the fax files obtained by FS from NAP VMMM are transferred to the FP hard disk for transmission. In this process FS converts the files, if necessary, from A-Series format into the appropriate format for transmission such as PC text. The FS 103 utilizes File Conversions 167 (FIG. 5) to effect the conversion. The FS then waits for the FileXfered response from the FP.

If required, the FS 103 switches the incoming line at the NIU 19 from the VIM DLP 25 to the selected FP port. This is accomplished by the FS issuing the NAP Connect Call command to NAP and receiving the Call Connected response from NAP. Thus, the NAPFE uses the Connect Call command to switch the existing connection to the specified FP port. The FS then issues the FP command OriginateXmit to the FP specifying the phone number derived from the dialog specified in the NAPFE command. The OriginateXmit command is sent to the FP port specified in the FP command. The FS then waits for the TransmitDone command from the FP indicating that the fax has been sent.

The FS then removes the file from the FP hard disk. In a manner similar to that described above with respect to Receive Fax, two procedures may be utilized to remove the file from FP disk. The FS issues the RemoveFile command to the FP naming the file and the FP responds to FS with FileRemoved. Alternatively, FS can issue the PortInitialize command to the FP setting the Removefile flag and receiving the Initialized response from the FP after the file has been deleted.

The FS then issues the NAPFE Fax Sent (Message Type 115) response back to the application through the COMS portion 130 (FIG. 3) consummating the Send Fax command originally sent by the application. At the discretion of the application, the transmitted fax may be deleted from the NAP VMMM data base. This is accomplished by the application issuing the standard NAP command Delete Voice Message and receiving from NAP the corresponding NAP response Message Deleted. A standard NAP Terminate Dialog command issued by the application to NAP can close out the dialog.

Poll and Receive Fax (Message Type 25). This command is sent by the application to the FS of NAPFE to request that the FP poll a fax machine to determine if that machine has an outgoing fax pending. If the fax machine does have an outgoing fax, then the fax is received by the FP. The connection associated with the specified Dialog ID is used for the fax polling and the fax receipt. If required, the FS uses a Connect Call NAP command to switch the existing NIU connection to the appropriate fax port. The FS issues the FP command OriginateRcv to the FP specifying the phone number of the fax machine to be polled, as derived from the current dialog. The FP returns the ReceiveDone response. The FS then issues the ReceiveFile command to the FP for transferring the file from FP disk to the FS A-Series disk file. The file is converted, if necessary, to the A-Series Fax Format by the File Conversions 167 (FIG. 5). The FP returns the FileXfered response to the FS.

The FS then issues the NAP command Create Voice Message to the NAP to store the converted file in the VMMM data base 40 as described above with respect to Receive Fax (Message Type 23). The FS then removes the file from the FP hard disk in the manner described above with respect to Receive Fax and thereafter issues the NAPFE response Fax Received back to the application consummating the original Poll and Receive Fax command. The command includes Recovery Token and DB Number fields for the reasons discussed above with respect to Receive Fax.

The above operations of Poll and Receive Fax results in the FS having the FP dial-out, poll the designated fax machine and receive the fax. The network connection may be effected by the NIU but the FP performs the dial-out procedure. The fax is then stored in the VMMM data base and the application is notified of its Message Number. A standard NAP Terminate Dialog command from the application can close out the sequence.

Send Fax after Poll (Message Type 26). This command is sent by the application to the FS of NAPFE to indicate that a fax machine will be polling the FP. When the poll is received, the specified fax is transmitted by the FP to the fax machine. The connection associated with the specified Dialog ID is used for the poll reception and fax transmission. The NAPFE uses the Connect Call NAP command to switch the existing connection to the FP. This NAPFE command results in a Fax Sent (Message Type 115) response. The command includes a Message Numbers field 126 (FIG. 2) to specify which fax messages are to be processed. The FS Uses either the OriginateXmit FP command or the OrigXmitNIU FP command depending on the connection protocol utilized.

Create Fax Message (Message Type 27). This command, sent from the application to the FS, informs NAPFE that a fax message is to be copied from a file and placed in the fax file maintained by NAP. Thus, the command creates a NAP fax message from the contents of a specified A-Series disk file. The FS converts the specified file to NAP VMMM format utilizing File Conversions 167 (FIG. 5). The command includes a Fax File Name field 127 (FIG. 2) containing an A-Series file title which will be used to identify the file containing the fax message. The command also includes the Recovery Token and DB Number fields for the reasons discussed above with respect to Receive Fax.

This command is utilized to originate a fax without having a fax machine. Since the fax cards 182 (FIG. 6) support direct conversion of text to fax images, a file created on a main frame computer or on a PC can be sent as a fax. The protocol of this command is utilized by the application to externally introduce such a file into the NAP system. After conversion, the data is stored in the VMMM data base and the application is notified of the new Message Number.

In response to the Create Fax Message command, the FS converts the file and issues a NAP Create Voice Message command to NAP which transfers the file into the VMMM data base. NAP responds to the FS with the NAP Message Created response and the FS issues the NAPFE Fax Created response back to the application.

Get Fax Message (Message Type 28). This command, issued by the application to the FS, informs NAPFE to copy the indicated fax message into the specified A-Series file for storage therein. Thus, once a fax has been received or created, the command provides a way to store the fax other than in the VMMM data base. The application can then manage the resultant file in the same manner as a normal A-Series disk file. The application issues the command specifying the VMMM Message Number and the name of the A-Series disk file to contain the message. The FS retrieves the fax from the VMMM data base and copies it into the specified A-Series file. The Fax File Name field 127 (FIG. 2) contains an A-Series file title which will be used to create the file containing the fax message. The command also includes Message Number field 126 (FIG. 2) which contains the Message Number representing the fax message to be placed in the specified disk file.

In order to obtain the file from the VMMM, the FS issues the NAP Get Voice Message command to NAP specifying the Message Number. NAP returns the NAP Message Created response to FS. FS converts the VMMM file to an appropriate format such as A-Series Fax Format thus creating the file specified in the Get Fax command. FS then issues the NAPFE Fax Obtained response back to the application.

Recover Fax Message (Message Type 29). This NAPFE command sent from the application to FS, is utilized by the application to initiate a fax recovery process to be described below. Both the application and NAPFE maintain tables of Recovery Tokens. The command is utilized by the application to recover any faxes that were received by the FP when an outage occurred. The NAPFE searches its table for the Recovery Token specified in the command. If the token is found, a Fax Received (Message Type 114) response is returned to the application along with the associated fax Message Number. A flag is set in NAPFE so that when the next NAP command is received (of any type), the entry is removed from the NAPFE recovery table. The command includes the Recovery Token field 124 and the Data Base Number field 125 to uniquely identify the application's Recovery Tokens which identify fax receptions that were in process at the time of a system or application outage.

Send Fax from File Message (Message Type 30). This command sent by the application to FS, informs NAPFE that a fax message is to be copied from a file and then sent to a fax machine. The connection associated with the specified Dialog ID will be used for the fax transmission. The command results in a Fax Sent (Message Type 115) response. The FS utilizes a Connect Call NAP command to switch the existing connection to the FP. The command contains the Fax File Name field 127 containing the A-Series file title utilized to identify the file containing the fax message.

The NAPFE provides one of the following four responses for all NAPFE commands that execute properly. The NAPFE responses are conceptually illustrated in FIG. 5 at 165 as described above.

Fax Received (Message Type 114). This response is generated by FS and returned to the application through the COMS portion 130 (FIG. 3) for any NAPFE command that receives a fax message. The response includes the Message Number field 126 (FIG. 2) for containing the NAP Message Number of the received fax message. The response also returns the results of the fax reception.

Fax Sent (Message Type 115). This response is generated by FS and returned to the application through the COMS portion 130 for any NAPFE command that transmits a fax message. The response returns the results of the fax transmission.

Fax Created (Message Type 116). This response is generated by FS and returned to the application through the COMS portion 130 for the NAPFE Create Fax (Message Type 27) command. The response indicates that a NAP fax message was successfully created from the contents of an external A-Series disk file. The response includes the Message Number field 126 (FIG. 2) for containing the Message Number of the created fax message.

Fax Obtained (Message Type 117). This response is generated by FS and returned to the application through the COMS portion 130 for the NAPFE Get Fax (Message Type 28) command. The response indicates that a NAP fax message was successfully retrieved and placed into an external A-Series disk file.

It is appreciated from the foregoing, that fax functionality is added to the NAP system of said U.S. Pat. No. 5,133,004 by the insertion of the COMS 101, as explained with respect to FIGS. 1 and 3, between the NAP 10 and the application 100 and the addition of the Fax Server 103 and Fax Processors 104. A fax application is designed to run as a normal NAP application in that the application is coded to use the existing AIM specification, as described in said U.S. Pat. No. 5,133,004, to communicate with NAP 10. COMS 101 and the Fax Server 103 adds the additional NAPFE command and responses to the existing AIM command-/response set. COMS 101 transmits all of the NAP and NAPFE commands and responses between the application and the platform as described above. It is further appreciated that the functions attributed herein to COMS 101 and the Fax Server 103 may be integrated into NAP (preferably into AIM 15) to perform the described functions.

The NAPFE commands and responses add additional functionality to permit the application to manage the transmission and reception of faxes in the manner that the standard NAP manages the transmission and reception of voice messages. Faxes are stored within NAP in exactly the same way that voice messages are stored as described in said U.S. Pat. No. 5,133,004. All NAPFE commands reference faxes by Message Number just as NAP commands reference Voice Messages by Message Number. A fax application can use several standard NAP message processing commands on fax messages. These commands are DELETE MESSAGE (Message Type 03) and GET MESSAGE NUMBERS (Message Type 12). Thus it is appreciated, that an application can intermix voice and fax functionality over a currently established network connection. Prior to issuing a NAPFE command, the application can conduct a voice dialog with NAP over the connection.

Because of the capabilities described in said U.S. Pat. No. 5,133,004 and the capabilities described herein, the NAP can switch the NIU 19 between voice and facsimile ports. Thus, all NAP and NAPFE commands and responses are available to the application through a common interface. In this way, the application can blend fax and voice functionality. The FP 104 has the responsibility to physically send and receive faxes. The NIU 19 switches incoming fax lines over to the FP so that the fax can be received. Outgoing faxes are sent directly out over the CO lines 106 (FIG. 1) or through the NIU 19. The FP hard disk drive 181 (FIG. 6) is used to stage the incoming and outgoing faxes.

As discussed above, the fax functions that NAP with NAPFE can invoke are: Receive Fax where the FP receives the fax over the current connection; Send Fax and Send Fax from File where the FP sends a fax over the current connection or over a newly originated connection; Poll and Receive Fax where the FP polls a fax machine over the current connection or over a newly originated connection to receive a fax; and Send Fax after Poll where the FP receives a poll over the current connection and then transmits the specified fax. Before issuing any of these commands, it is the responsibility of the application to establish a network connection to the fax machine. This can be done in two ways:

1. In response to detecting ring at an NIU port, the application receives an Incoming Call response from NAP. In accordance with NAP protocol, the application then issues a Connect Call command to NAP. Optionally, a voice dialog can occur prior to the fax operation. The signalling accompanying the incoming call identifies that a fax transaction is required. For example, if the call was transferred by the Central Office to the NAP from a busy fax machine, the Called Number Identification permits the NAP to determine that a fax application is involved from the application tables maintained in NAP.

2. The application issues an Initiate Call command followed by a Pivot Call command. The application places the phone number for the outgoing call in the body of the Initiate Call command. The call is out-dialed by the NAP and pivoted to an NIU port connected to an FP port. The FP command, issued as part of the NAPFE command, includes a code in the phone number field so that the fax port connects with the NIU port to which the call was pivoted. Alternatively, the Initiate Call and Pivot Call commands are intercepted by the trap 132 (FIG. 3) and the phone number for the outgoing call is transferred to the phone number field of the FP command that forms part of the NAPFE command. When the NAPFE command is issued including an FP command of OriginateRcv or OriginateXmit, the FP then out-dials the call.

The above establishes a call associated with the current dialog. When the NAPFE command is issued, the requested fax action is performed utilizing the network connection associated with the Dialog ID in the command header. It is appreciated from the foregoing descriptions of the NAPFE commands, that a NAP Connect Call command is utilized to connect the existing call with the selected FP port. After the fax function is complete, the FP goes on-hook causing the connection to be terminated. The application then closes out the dialog with a Terminate Dialog command.

The described approach allows the application to have full control of the fax operations. Fax functions can be performed over any network connection that an application can establish using NAP. The described design renders the NAPFE functionally independent of, and compatible with, NAP capabilities. As discussed above, the execution of NAPFE commands often requires that standard NAP commands be used as part of the program steps to perform the desired fax function. When a program step in a fax transaction causes a NAP command to be issued, a flag (not shown) is set for that Dialog ID to intercept the next response for that dialog and utilize it to trigger execution of the remaining program steps.

When an application has answered an incoming call to the NIU, it may be desirable for the application to transmit a fax over that connection. The OriginateXmit-NIU FP command and the WaitCompleted FP command are utilized. The OriginateXmitNIU provides an immediate response to the Fax Services software. The WaitCompleted command only responds when the selected fax port completes its current receive or transmit. Specifically, the NAP receives Ring Detect from the NIU incoming call and responds to the application with the unsolicited response Incoming Call. The application issues Connect Call to the NAP and the NAP responds to the application with Call Connected. A voice dialog may now occur between the application and NAP. After the voice dialog, the application issues the NAPFE command Send Fax to the FS. The FS obtains the fax message by issuing the NAP command Get Voice Message to the NAP which responds to the FS with Command Executed. The FS transmits the fax obtained from NAP to the FP by issuing the FP command SendFile. When the file has been received by the FP, the FP responds to the FS with FileXfered. The FS then commands the FP to dial-out to the NIU and transmit the fax thereto by issuing the FP command OrigXmitNIU. The FP responds back to the FS with FaxPortReady. The FS then issues Connect Call to the NAP which responds with Call Connected. The FS then issues WaitCompleted to the FP which in response to detecting On-Hook from the NIU issues TransmitDone to the FS. The FS then removes the file from the FP hard disk by issuing RemoveFile thereto which responds back to the FS with FileRemoved. The FS then consummates the Send Fax command from the application by returning Fax Sent thereto. The application may delete the message from the NAP data base by issuing the NAP command Delete Voice Message to the NAP which responds to the application with Message Deleted. The dialog is closed out by the application by issuing Terminate Dialog to the NAP.

It may also be desirable for NAPFE to be able to initiate a call through the NIU and to then transmit a fax over that outgoing connection. A procedure for accomplishing this utilizes the trap 132 (FIG. 3). The application issues Initiate Call to the FS which responds to the application with Call Connected. The application issues a Pivot Call to the FS which responds to the application with Call Connected. NAPFE traps the Initiate Call in the trap 132 and saves off the outgoing port specification. NAPFE also traps the Pivot Call command.

The application then issues a Send Fax command to FS and NAPFE downloads the fax to the FP disk and has the fax port go off-hook. This is accomplished by FS issuing Get Voice Message to NAP which responds back to FS with Command Executed. FS then issues SendFile to FP which responds back to FS with FileXfered. FS then issues OriginateXmit to FP which goes off-hook to the NIU. NAPFE traps this Incoming Call in the trap 132 and issues a Connect Call using the saved outgoing port specification. This causes an outgoing call to the network and connects the fax port to the outgoing connection. Normal fax transmission then occurs.

It is appreciated that when the fax port goes off-hook, the Incoming Call initiates a new Dialog ID. Specifically, after the file is on FP disk and after the FP goes off-hook to the NIU, NAP sends the unsolicited response Incoming Call to FS which responds to NAP with the Connect Call command. NAP responds back to the FS with Call Connected and the FS issues Collect Digits to the NAP as a time-out. When FP goes on-hook to the NIU, the NAP responds to FS with Command Executed and FS sends the Terminate Dialog command to NAP for the new dialog.

The FP then responds to FS with TransmitDone and FS commands FP with RemoveFile. FP responds to FS with FileRemoved. The original Send Fax command from the application to FS is consummated by FS responding to the application with Fax Sent.

The fax may then be deleted from NAP by the application issuing Delete Voice Message thereto. NAP responds to the application with Message Deleted and the application terminates the original dialog by issuing Terminate Dialogue to NAP. The Incoming Call unsolicited response from NAP to FS and the subsequent new dialog therebetween, was performed in the capacity of the FS as an application with respect to NAP.

It is appreciated from the foregoing that because of the sophisticated NIU call connectivity control by NAP, the application can establish appropriate network connections for reception and transmission of fax messages. For calls coming into the NAP, either for the purpose of sending a fax thereto or for polling the NAP for a fax, the NAP issues an unsolicited Incoming Call response to the application. Because of signalling accompanying the call, the NAP determines that a fax transaction is desired. AIM commands such as Connect Call and Pivot Call can be utilized to effect the appropriate connections between FP, NIU and the network. For calls initiated by the NAP, either for sending a fax or for polling a fax machine, the Initiate Call command is utilized followed by appropriate AIM call switching commands.

For the purpose of appropriately routing fax messages and calls to appropriate NIU ports, NAPFE commands utilize a predetermined outpulse rule that is detected by NAPFE to provide discrimination between fax and non-fax transactions. In this regard, the Fax Processor 104 can connect directly with the Central Office or with the network through the NIU 19. The trap 132 can optionally be utilized, as described above.

It is noted that the call connectivity AIM commands, such as Pivot Call, as set forth in said U.S. Pat. No. 5,133,004, may not provide precisely the switching functionality required for NAPFE commands. The trap 132 (FIG. 3) is utilized in the manner described above to effect the appropriate connections. Alternatively, the requisite switching functionality can be added to the AIM command set by the inclusion of a new appropriate NAP command, thus obviating the need for the trap 132.

Referring again to FIG. 1, the FP DLP 109 and the high-speed parallel link 108 comprise a commercially procurable A-Series computer to PC data transfer connection available, for example, from Express-Link, Inc., of Richmond, Va. The FP DLP 109 is implemented by the Express-Link DLP and is a well known type of A-Series communication interface. The FP DLP 109 appears to the A-Series system like a GCR tape DLP.

As discussed above, the FP operates independently from the A-Series host on which NAP and NAPFE are installed. Once an FP command is issued to receive a fax, the FP will, in the absence of a hardware failure or powerdown, receive the fax. The FP reception process confirms to the fax machine that the FP received the fax and has it stored on its hard disk.

A timing window, however, exists between the application, NAPFE and the FP where an incoming fax message can get lost. NAPFE utilizes a recovery mechanism that guarantees fax reception. The mechanism ensures that the application will be aware of all faxes received by the FP so that fax messages will not get lost. The timing window results, for example, when a system or an application interrupt occurs between the time a fax is received on the FP disk and the time the fax Message Number is entered into the application data base.

The basis of the NAPFE guaranteed fax reception is the Recovery Token and the NAP application Data Base Number stored in fields 124 and 125 of the NAPFE command body 121, as illustrated in FIG. 2. The Recovery Token is specified on all commands where faxes are received or created. The application assigns a new and unique Recovery Token to each Receive Fax, Poll and Receive Fax and Create Fax command. The Recovery Token combined with the application Data Base Number creates a unique ID for each fax reception. This unique ID is utilized by NAPFE to ensure the complete reception and archiving of all incoming faxes.

The recovery information is maintained in the Recovery Table 168 illustrated in FIG. 5. The Recovery Table 168 stores, inter alia, the application's NAP Data Base Number and the defined application Recovery Token. The application also maintains a list of issued Recovery Tokens and information pertinent thereto. The application places a new Recovery Token in its Recovery Token list for commands that have not been completed. The application issues a desired NAPFE command specifying the associated Recovery Token. When the FS issues the FP file transfer command ReceiveFile (Message Type 92), FS records the associated Recovery Token and Data Base Number in the Recovery Table 168, as well as the associated FP port number. The port number is in the field 152 of the FP command (FIG. 4B).

If the receipt of the file by FS and the archiving in VMMM is not successful, the involved FP port remains Inuse and cannot be used for reception or transmission of further fax messages until cleared by, for example, Initialization. Thus, the entry in the Recovery Table 168 uniquely identifies received faxes until reception and archiving is complete. Created faxes are also uniquely identified by the information in the Recovery Table 168 because of the manner in which the Create Fax Message protocol functions.

When a received or created fax message is completely transferred from FP disk and archived in the VMMM data base, the associated entries in the application Recovery Token list and the Recovery Table 168 of NAPFE are deleted. The recovery process involves the application issuing the NAPFE Recover Fax command for each token remaining on the application list with the entries from the application list and NAPFE Recovery Table 168 being deleted upon successful transfer of the fax. When the Recover Fax command is issued by the application, the FP is checked for faxes that were received but never moved to the VMMM. If such faxes are found, they are transferred utilizing the file transfer protocol discussed above with respect to the NAPFE Receive Fax command. When the recovered fax is successfully transferred and archived, the entry is removed from the Recovery Table.

When a Receive Fax, Poll and Receive Fax or Create Fax command is issued to FS, the Recovery Table entry is allocated. After FS issues a Fax Received response (resulting from a Receive Fax, Poll and Receive Fax or Recovery Fax command), NAPFE considers the next received NAP or NAPFE command as a positive acknowledgment from the application that the application has saved the fax Message Number and information to disk and that the application has archived the data in VMMM. In response thereto, NAPFE clears the Recovery Token entry associated with the previous Fax Received response from the Recovery Table.

Recovery may be executed as part of application initialization. The application performs the recovery processing as follows:

1. Issue a Recover Fax command for the first token in the application Recovery Token list. This causes the fax to be transferred from the FP to the VMMM resulting in a normal Fax Received response specifying the Message Number and information for the associated fax.
2. Log the Message Number for the fax in the application data base.
3. Delete the Recovery Token from the application list.
4. Issue the next NAP or NAPFE command. This clears the Recovery Token entry from the NAPFE Recovery Table.
5. Repeat the above steps 1–4 for each Recovery Token in the application list.
6. Perform normal NAP message reconciliation utilizing the Get Message Numbers command as described in said U.S. Pat. No. 5,133,004 and U.S. Pat. No. 5,138,710.

It is appreciated from the foregoing with respect to FIG. 1, that although the Fax Server 103 is illustrated as a separate block for convenience of description, the Fax Server 103 is part of NAP 10 and resides in main memory 18. FS 103 may be considered as an extension of AIM 15. The physical devices such as phone lines, switches or fax machines, as well as the actual voice or fax data, are not visible to the application. The application makes high level requests (Send Fax, Receive Fax) referencing the fax image by Message Number and referencing the destination by phone number or other appropriate identification such as subscriber ID. In this manner, the application concentrates on management of the faxes, as they flow through the system, and avoids the details of handling the hardware.

The above-described embodiment was explained in terms of utilizing file conversion with respect to file format in transferring files between the FP hard disk and the VMMM. It is appreciated that the fax message data from a facsimile station can be received and stored in the VMMM message data base without conversion as, for example, a Group III image in accordance with the CCITT T.4 and T.30 recommendations. The stored message data can also be sent to a facsimile station by NAP without conversion. Thus, no conversion is required in the process of storage or retrieval of Group III compressed fax message data.

The Fax Processors 104 are integrated into the NAP architecture using the NIU 19 which provides the FP with interfaces to the network. The NIU also provides the capability to switch between an incoming or outgoing telephone line and a facsimile or voice port. This allows the same call to carry voice prompts, DTMF responses, voice annotations, and facsimile messages. Basically, NAP has been extended to send fax messages to a fax station, receive fax messages from a fax station, send fax messages to a polling fax station, and receive fax messages from a polled fax station. These commands can be used on a call that was either originated or answered by the system.

It is appreciated from the foregoing, that the NAP has been extended to support the transmission and reception of facsimile message documents. This was accomplished by adding the additional commands and responses described herein to those supported by NAP as disclosed in said NAP PATENTS. The extensions allow an enhanced service on NAP that provides for the storage and retrieval of facsimile documents between a facsimile machine (Group III compliant, for example) and NAP. The present invention allows NAP to provide facsimile messaging services together with the voice messaging services described in said NAP PATENTS. Voice prompts, DTMF responses, voice storage and retrieval, and facsimile storage and retrieval are combined in a single service. It is appreciated that the FP can store the entire fax image prior to transmission to the network and can also store the entire fax image after reception from the network prior to sending it up to the VMMM. Initiating transmission to the network one page at a time after storage of several pages of a fax in FP is also contemplated within the scope of the present invention.

It is further appreciated that if NAPFE is integrated into NAP, COMS will no longer be the agent that directs commands. AIM will then determine whether the incoming command is a fax or voice type command and will direct the command accordingly.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A telephone network application platform for interfacing between a telephone network and at least one facsimile application program, said platform comprising:

digital computer means programmed to be operative to perform telephone network facsimile functionality in response to facsimile commands issued by said facsimile application program, said telephone network facsimile functionality residing in said computer means independent of said facsimile application program and actuatable in response to said facsimile commands, said facsimile commands including a Send Fax command and a Receive Fax command, said telephone network facsimile functionality including sending a facsimile message to said network and receiving a facsimile message from said network in response to said Send Fax command and said Receive Fax command, respectively, application interface means coupled to receive said facsimile commands from said facsimile application program and responsive to said facsimile commands for actuating said telephone network facsimile functionality in response to and in accordance with said facsimile commands, said application interface means being responsive to said Send Fax command and said Receive Fax command from said facsimile application program for activating said telephone network facsimile functionality by causing a facsimile message to be sent to said network and causing a facsimile message to be received from said network in response to said Send Fax command and said Receive Fax command, respectively, and facsimile interface means coupled between said network and said computer means for conveying said facsimile messages therebetween.

2. The platform of claim 1 wherein
said facsimile commands include a Poll and Receive Fax command, and
said telephone network facsimile functionality includes sending a poll to a facsimile machine through said network and, in response to said poll, receiving a facsimile message from said facsimile machine through said network in response to said Poll and Receive Fax command.

3. The platform of claim 1 wherein
said facsimile commands include a Send Fax after Poll command, and
said telephone network facsimile functionality includes receiving a poll from a facsimile machine through said network and, in response to said poll, sending a facsimile message to said facsimile machine through said network in response to said Send Fax after Poll command.

4. The platform of claim 1 further including platform data storage means coupled to said computer means for storing said facsimile messages.

5. The platform of claim 4 wherein
said facsimile commands include a Create Fax command, and
said telephone network facsimile functionality includes creating a facsimile message for storage in said platform data storage means in response to said Create Fax Message command by copying a message residing in a file of said facsimile application program into said platform data storage means.

6. The platform of claim 4 wherein
said facsimile commands include a Get Fax command, and
said telephone network facsimile functionality includes getting a facsimile message from said platform data storage means into a file of said facsimile application program in response to said Get Fax command by copying a message residing in said platform data storage means into a file of said facsimile application program.

7. The platform of claim 4 wherein
said facsimile commands include a Send Fax from File command, and
said telephone network facsimile functionality includes sending a facsimile message from a file external to said platform data storage means to said network in response to said Send Fax from File command.

8. The platform of claim 4 wherein
said facsimile interface means comprises facsimile processor means including facsimile processor storage means for storing said facsimile messages to be sent to said network and said facsimile messages received from said network,
said facsimile processor means being programmed to be operative to perform facsimile processor functionality in response to facsimile processor commands,
said facsimile processor functionality including transmitting a facsimile message stored in said facsimile processor storage means to said network and storing a facsimile message received from said network in said facsimile processor storage means.

9. The platform of claim 8 wherein
said application interface means includes facsimile server means responsive to said facsimile commands and operative to expand said facsimile commands into said facsimile processor commands and to issue said facsimile processor commands to said facsimile processor means for execution of said facsimile processor functionality in accordance therewith.

10. The platform of claim 9 wherein
said facsimile processor functionality includes answering an incoming call to said facsimile processor means and originating an outgoing call from said facsimile processor means.

11. The platform of claim 10 wherein
said facsimile processor commands include an AnswerRcv command, and
said facsimile processor functionality includes, in response to said AnswerRcv command, answering an incoming call to said facsimile processor means, receiving an incoming facsimile message over said incoming call and storing said incoming facsimile message in said facsimile processor storage means.

12. The platform of claim 10 wherein
said facsimile processor commands include an OriginateRcv command, and
said facsimile processor functionality includes, in response to said OriginateRcv command, originating a call to a specified phone number, polling over said originated call for a facsimile message, receiving a facsimile message over said originated call and storing said received facsimile message in said facsimile processor storage means.

13. The platform of claim 10 wherein
said facsimile processor commands include an OriginateXmit command, and
said facsimile processor functionality includes, in response to said OriginateXmit command, originating a call to a specified phone number and transmitting a facsimile message from said facsimile processor storage means over said originated call.

14. The platform of claim 10 wherein
said facsimile processor commands include an AnswerXmit command, and
said facsimile processor functionality includes, in response to said AnswerXmit command, answering an incoming call and transmitting a facsimile message over said incoming call from said facsimile processor storage means when a poll is received over said incoming call.

15. The platform of claim 10 wherein
said facsimile processor commands include a RemoveFile command, and
said facsimile processor functionality includes deleting a specified facsimile message from said facsimile processor storage means in response to said RemoveFile command.

16. The platform of claim 10 wherein
said facsimile processor commands include a SendFile command, and
said facsimile processor functionality includes transferring a specified facsimile message from said facsimile server means to said facsimile processor storage means in response to said SendFile command.

17. The platform of claim 10 wherein
said facsimile processor commands include a ReceiveFile command, and said facsimile processor functionality includes transferring a specified facsimile message from said facsimile processor storage means to said facsimile server means in response to said ReceiveFile command.

18. The platform of claim 9 wherein
said facsimile processor means comprises a personal computer, and
said facsimile processor storage means comprises a personal computer hard disk drive.

19. The platform of claim 10 wherein
said facsimile processor means includes facsimile processor ports through which said facsimile messages conveyed between said facsimile processor storage means and said network are transmitted.

20. The platform of claim 19 further including network interface means having network interface means ports coupled to said network, to said computer means and to said facsimile processor ports, and wherein
said platform interfaces between said telephone network and one or more application programs requiring voice functionality, facsimile functionality and call connectivity functionality,
said digital computer means is programmed to be operative to perform telephone network functionality in response to commands issued by said application programs, said telephone network functionality residing in said computer means independent of said application programs and actuatable in response to said commands,
said application interface means is coupled between said application programs and said computer means and responsive to said commands from said application programs for actuating said telephone network functionality in response to and in accordance with said commands,
said commands include call connectivity commands, voice commands and said facsimile commands,
said telephone network functionality comprises telephone network call connectivity functionality, telephone network voice functionality and said telephone network facsimile functionality actuatable in response to said call connectivity commands, said voice commands and said facsimile commands, respectively,
said call connectivity commands and said voice commands denote as NAP commands,
said telephone network call connectivity functionality and said telephone network voice functionality denote as NAP functionality, and
said telephone network call connectivity functionality is operative to activate and interconnect said network interface means ports.

21. The platform of claim 20 wherein
said application interface means includes said facsimile server means for actuating said facsimile functionality in response to said facsimile commands and further includes an Application Interface Module (AIM) portion for actuating said NAP functionality in response to said NAP commands.

22. The platform of claim 21 wherein
said facsimile server means is further operative to expand said facsimile commands into said facsimile processor commands and said NAP commands and to issue said NAP commands to said AIM portion for actuation of said NAP functionality in accordance with said NAP commands.

23. The platform of claim 22 further including communication means interposed between said applications and said application interface means for directing said facsimile commands to said facsimile server means and said NAP commands to said AIM portion.

24. The platform of claim 23 wherein
said facsimile server means is further operative to issue said NAP commands to said AIM portion through said communication means.

25. The platform of claim 22 wherein
said application interface means is operative to provide Responses to said application program, said Responses including an Incoming Call response engendered by said platform receiving a telephone call from said network,
said NAP commands include a CONNECT CALL command and said NAP functionality includes switching said network interface means ports in response to said CONNECT CALL command,
said NAP commands include an INITIATE CALL command and said NAP functionality includes initiating a telephone call to said network in response to said INITIATE CALL command,
said NAP commands include a CREATE VOICE MESSAGE command and said NAP functionality includes creating a message for storage in said platform data storage means in response to said CREATE VOICE MESSAGE command by copying a message residing in a file external to said platform data storage means into said platform data storage means, and
said NAP commands include a GET VOICE MESSAGE command and said NAP functionality includes getting a message from said platform data storage means into a file external to said platform data storage means in response to said GET VOICE MESSAGE command by copying a message residing in said platform data storage means into a file external to said platform data storage means.

26. The platform of claim 25 wherein
said facsimile server means is further operative to expand said facsimile commands to include said CONNECT CALL command for switching said network interface means ports so as to connect a network interface means port with a facsimile processor port.

27. The platform of claim 25 further including
facsimile server storage means,
said facsimile server means being operative to temporarily store facsimile messages in said facsimile server storage means.

28. The platform of claim 27 wherein
said facsimile commands include facsimile sending commands for sending facsimile messages to said network and facsimile receiving commands for receiving facsimile message from said network, said Send Fax command and said Receive Fax command being a facsimile sending command and a facsimile receiving command, respectively,
said facsimile server means is operative to expand a facsimile sending command into said GET VOICE MESSAGE command for transferring a facsimile message from said platform data storage means to said facsimile server storage means and into a facsimile processor command for transferring said facsimile message from said facsimile server storage means to said facsimile processor storage means, and said facsimile server means is operative to expand a facsimile receiving command into a facsimile processor command for transferring a facsimile message from said facsimile processor storage means to said facsimile server storage means and into said CREATE VOICE MESSAGE command for transferring said facsimile message from said facsimile server storage means to said platform data storage means.

29. The platform of claim 20 wherein said application interface means communicates with said application program in dialogs, voice messages and facsimile messages are conveyed through said network interface means over a common connection currently established during a dialog, said network interface means ports are switched between voice ports and facsimile ports, and voice messages and facsimile messages are commonly stored in said platform data storage means.

30. The platform of claim 9 wherein said facsimile commands include at least one command operative to transfer a facsimile message from said facsimile processor storage means to said platform data storage means, said facsimile message having been received from said network, said application program is operative to assign a unique Recovery Token to a facsimile message to be received from said network pursuant to a facsimile command, said application program having an application Recovery Token table for storing said Recovery Tokens, said Recovery Token being passed to said facsimile server means as part of a facsimile command issued thereto, said facsimile server means includes a Recovery Token table for storing said Recovery Token passed thereto from said application program, and said facsimile server means is operative to notify said application program of a successful transfer of a facsimile message from said facsimile processor storage means to said platform data storage means and further operative to remove from said Recovery Token table, a Recovery Token associated with a facsimile message successfully transferred from said facsimile processor storage means to said platform data storage means.

31. The platform of claim 30 wherein said facsimile server means is operative to remove said Recovery Token from said Recovery Token table upon receipt by said platform from said application program of a next command following notification of said application program by said facsimile server means of said successful transfer of a facsimile message.

32. The platform of claim 30 wherein said facsimile commands include a Recover Fax command, said Recover Fax command conveying a Recovery Token therewith, and said telephone network facsimile functionality includes transferring a facsimile message identified by said Recovery Token from said facsimile processor storage means to said platform data storage means and notifying said application program of said transfer.

* * * * *